United States Patent [19]

Ojima et al.

[11] 4,128,889
[45] Dec. 5, 1978

[54] PEN TYPE ELECTRONIC DIGITAL CALCULATOR

[75] Inventors: Shin Ojima, Yao; Kazuhiko Ohgami, Higashiosaka; Kazutaka Watanabe, Yao; Masaru Nohara, Yao; Kenji Yamamoto, Yao, all of Japan

[73] Assignee: Hoshidenki-Seizo Kabushiki Kaisha, Osaka, Japan

[21] Appl. No.: 809,728

[22] Filed: Jun. 24, 1977

[30] Foreign Application Priority Data

Jun. 28, 1976 [JP] Japan .............................. 51-85422[U]
Jan. 14, 1977 [JP] Japan .............................. 52-3253[U]
Jan. 14, 1977 [JP] Japan .............................. 52-3254[U]

[51] Int. Cl.$^2$ ........................ G06F 3/02; G06F 15/02
[52] U.S. Cl. ................................. 364/705; 200/5 A; 364/708; 364/709
[58] Field of Search ...................... 364/705, 708, 709; 200/5 A

[56] References Cited

U.S. PATENT DOCUMENTS

| | | | |
|---|---|---|---|
| 3,937,939 | 2/1976 | Frenkel | 364/705 |
| 3,940,758 | 2/1976 | Margolin | 200/5 A X |
| 4,007,364 | 2/1977 | Ojima et al. | 364/705 |
| 4,029,915 | 6/1977 | Ojima | 200/5 A |

*Primary Examiner*—Jerry Smith
*Attorney, Agent, or Firm*—Pollock, Vande Sande and Priddy

[57] ABSTRACT

A pen type electronic digital calculator in which keys are arranged in three rows on one half part of the tubular body in its lengthwise direction and when the three rows of keys are held substantially horizontal, the top surface of each key of the central row is higher than the top surfaces of the keys of the other rows. The keys of the respective rows are mounted so that they are longitudinally spaced from the keys of adjacent rows, and each key is disposed at the center of a recess formed in the tubular body.

5 Claims, 18 Drawing Figures

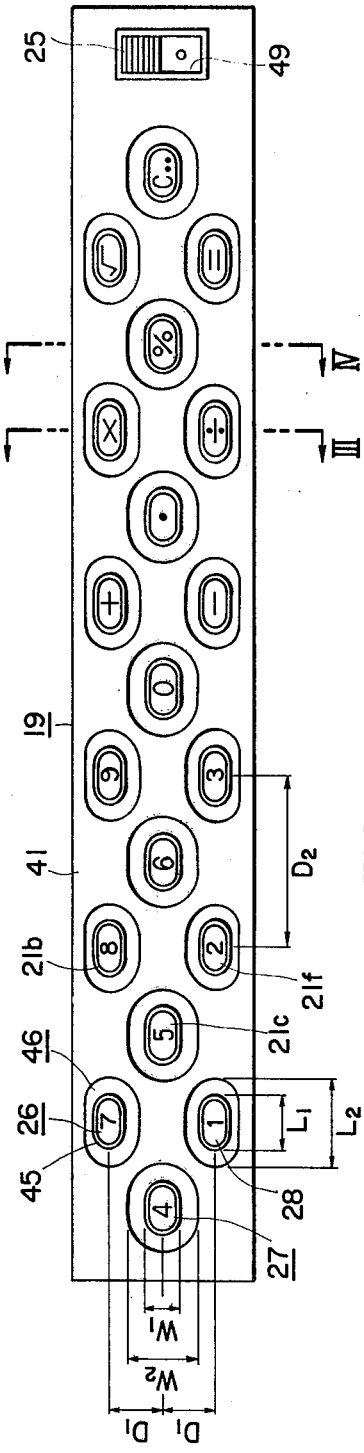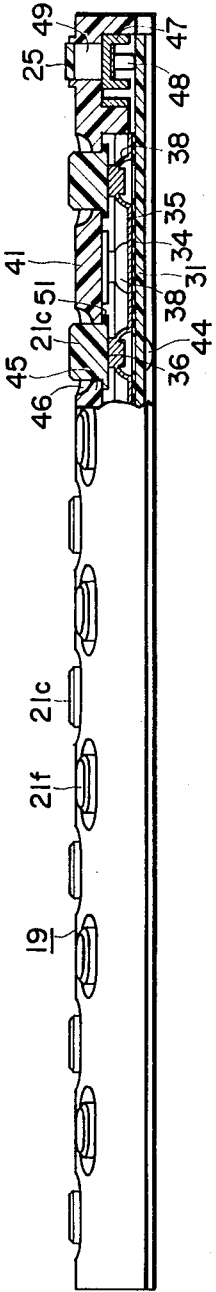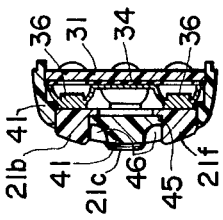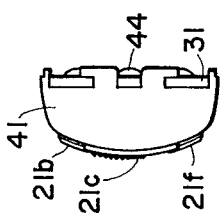

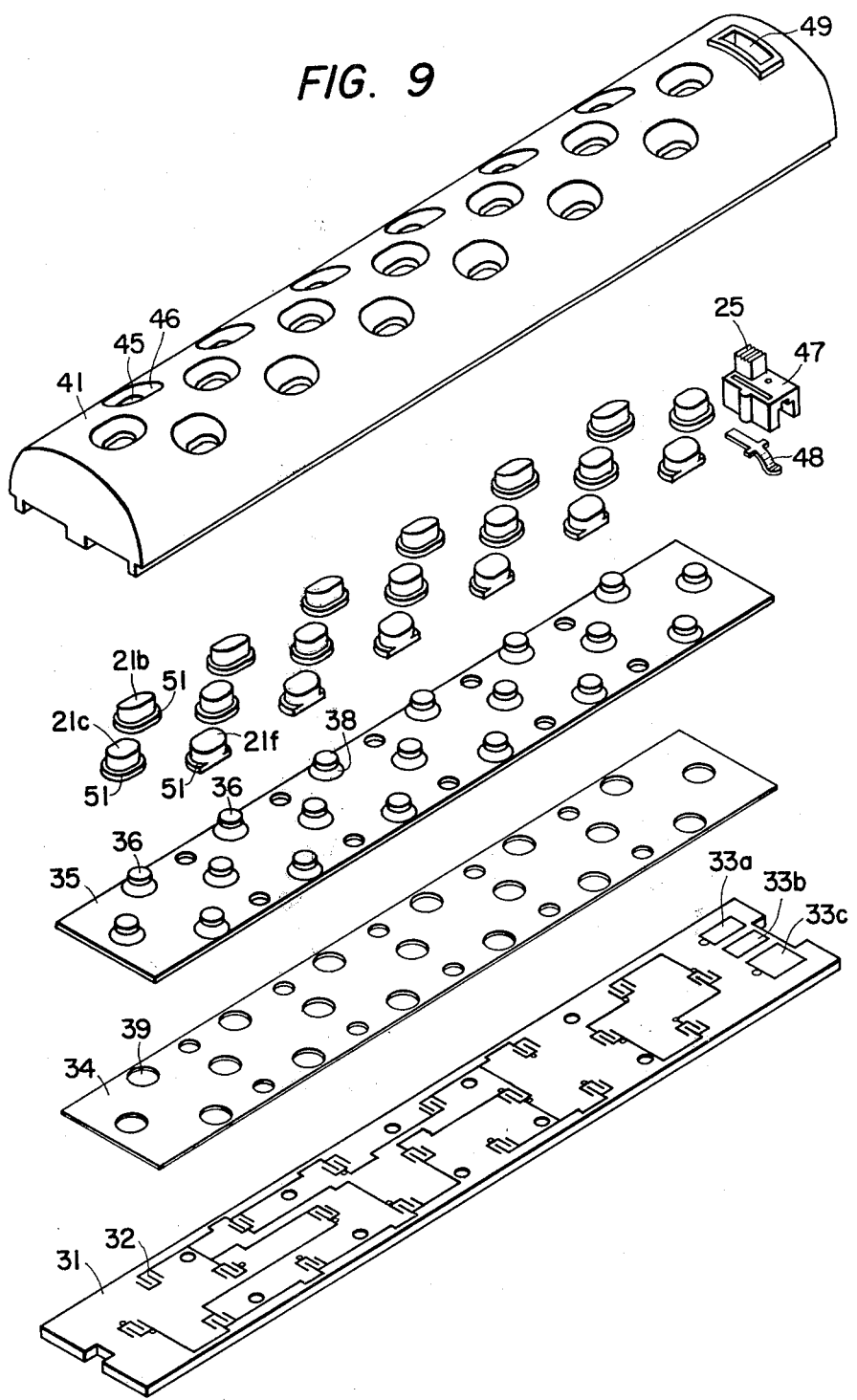

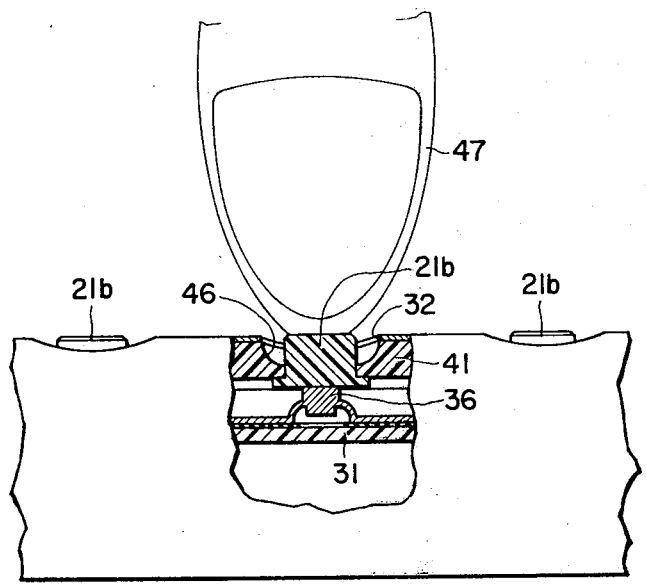
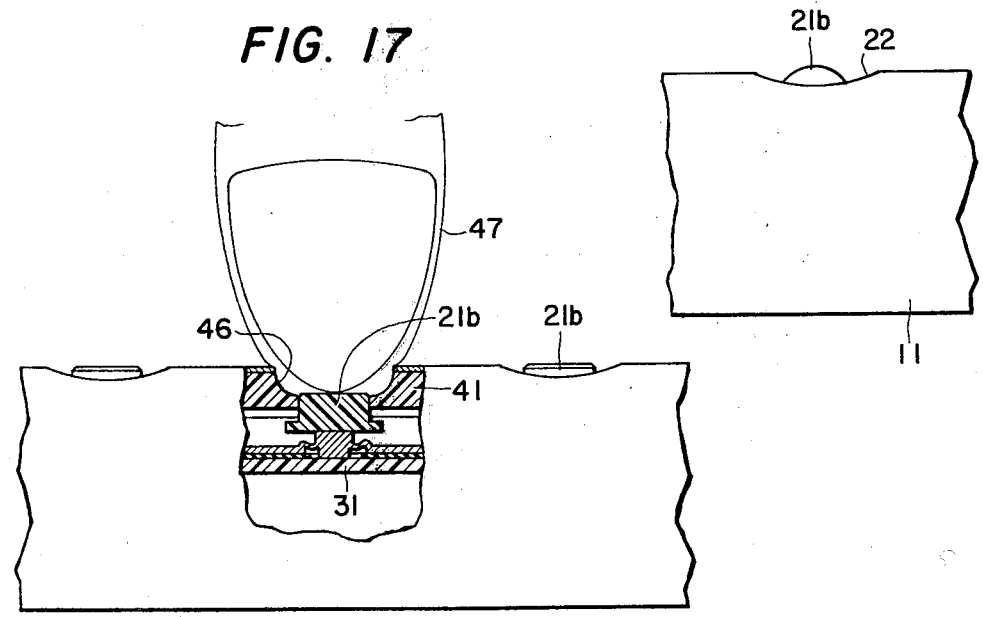

PEN TYPE ELECTRONIC DIGITAL CALCULATOR

BACKGROUND OF THE INVENTION

This invention relates to an electronic digital calculator having a size and shape similar to a pen or pencil and containing a display screen, input value setting keys, and function keys which are arranged on the calculator so that it is easy to operate and almost free from an erroneous operation.

This kind of calculator heretofore used is set forth in U.S. Pat. No. 3,937,939 entitled "Single-Handed Digital Calculator." This conventional calculator is designed to be operated by one hand of the user so that a desired one of keys is actuated by the finger of the hand nearest it, with the body held by the thumb and the four other fingers of one hand of the user. If the number of keys to be selectively actuated is large, the keys are likely to be erroneously actuated, or the calculator itself becomes bulky, so that the abovesaid calculator is adapted to input two pieces of information by one key. Since the calculator is designed so that a plurality of pieces of information are selectively inputted by one key, the key actuation is not easy to perform and cannot be achieved rapidly. If the keys are actuated rapidly, an erroneous operation is likely to occur. Even if the keys of the abovesaid prior art calculator are selectively actuated by one hand of the user while held in the other hand, there is a fear of an erroneous key operation. In the case of using keys which are each capable of inputting only one piece of information as in an ordinary electronic digital calculator, even if the keys are reduced in size, the keys are inevitably disposed very close to adjacent ones of them when as many keys as 20 are mounted on the body of the same size as a pen. Consequently, when a desired one of the keys is actuated, the adjoining keys are liable to be pressed.

An object of this invention is to provide a pen type electronic digital calculator having a shape and size similar to a pen which is easy to operate and can be actuated rapidly and accurately.

Another object of this invention is to provide a pen type electronic digital calculator which employs keys, each inputting only one piece of information, and which can be operated rapidly and accurately.

Still another object of this invention is to provide a pen type electronic digital calculator designed so that keys do not hinder when the calculator is inserted into and taken out of a pocket.

SUMMARY OF THE INVENTION

According to this invention, one end portion of the tubular body of the calculator is tapered and a ball-point pen is attached to the tapered end of the body. An opening for display is formed in the body on the side of the ball-point pen to extend in its lengthwise direction, and is covered with a transparent filter, and a display element for displaying the calculation result, which is formed with, for example, an integrated circuit of light emitting diodes, is housed in the body in opposing relation to the abovesaid filter. In the body, keys are arranged in three rows in the direction of extension of the abovesaid opening. These keys are respectively mounted on a keyboard switch disposed in the body, and protrude above the outer surface of the body through holes formed therein. A semiconductor integrated circuit element for calculation is also disposed in the body and, when a selected one of the keys is actuated, information indicative of the numeral value of any one of 0 to 9 or the function such as addition, subtraction, the sign of equality or the like is supplied to the abovesaid semiconductor integrated circuit element, in which a required calculation is carried out, and the calculation result is displayed by the display element. A battery for supplying power to the display element and the semiconductor element is also housed in the body.

The calculator is adapted so that each of the keys is capable of inputting only one kind of information. Further, the three rows of keys are arranged so that when they are held substantially horizontal, the top surface of each key of the central row is higher than the top surfaces of the keys of the side rows. The keys of each row are each disposed opposite to the intermediate portion between adjacent keys of the adjoining row. Further, the keys are each positioned at the center of each hole formed in the body and this hole overlies each key insertion hole of the frame of the keyboard switch, which key insertion hole is provided in the form of a recess whose diameter gradually increases as the outer surface of the body is approached. This recess is shaped to conform to the inner surface of the tip of a finger pressing the top surface of the key. The top surface of each key is substantially flush with the outer surface of the body, and extends along it. When a desired key is pressed by the finger tip, even if the key is moved relatively greatly, the recess ensures to prevent that the adjoining keys are pressed earlier than the desired key. Moreover, since the key operation is achieved after the body of the calculator is slightly turned about its axis to bring the key array of the key to be actuated to a position higher than the other key arrays, there is no possibility that the keys adjacent to the desired one are erroneously pressed. Thus, the keys can be disposed closely and about 20 keys can be mounted on a small body of the calculator.

BRIEF DESCRIPTION OF THE DRAWINGS

FIG. 5 is a plan view of a keyboard switch for use in the calculator of this invention;

FIG. 6 is a front view, partly in section, of the keyboard switch depicted in FIG. 5;

FIG. 7 is a right end view of the keyboard switch of FIG. 5;

FIG. 8 is a cross-sectional view taken along the line III—III in FIG. 5;

FIG. 9 is an exploded perspective view showing the keyboard switch of FIG. 5;

FIG. 16 is a diagram showing the state in which a finger is in contact with the key;

FIG. 17 is a diagram showing the state in which the key is pressed by the finger; and FIG. 18 is a diagram illustrating another example of the configuration of the key.

DESCRIPTION OF THE PREFERRED EMBODIMENTS

Figure 1:
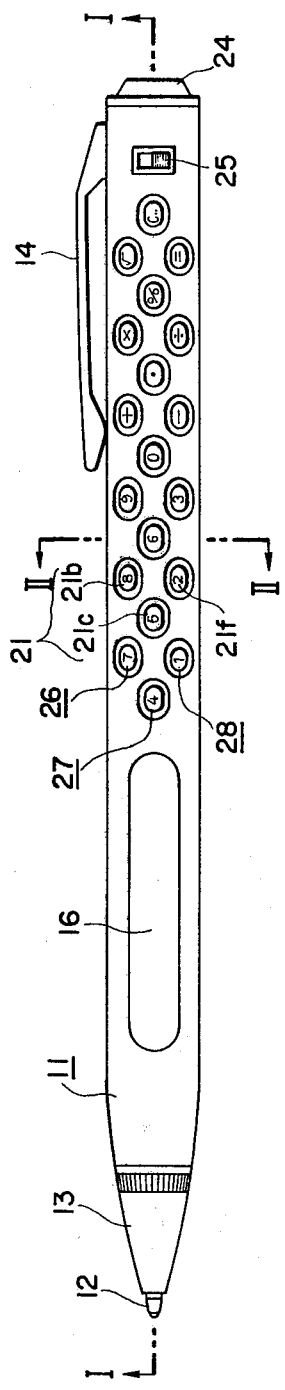
FIG. 1 is a plan view showing an embodiment of a pen type electronic digital calculator according to this invention.
Figure 2:
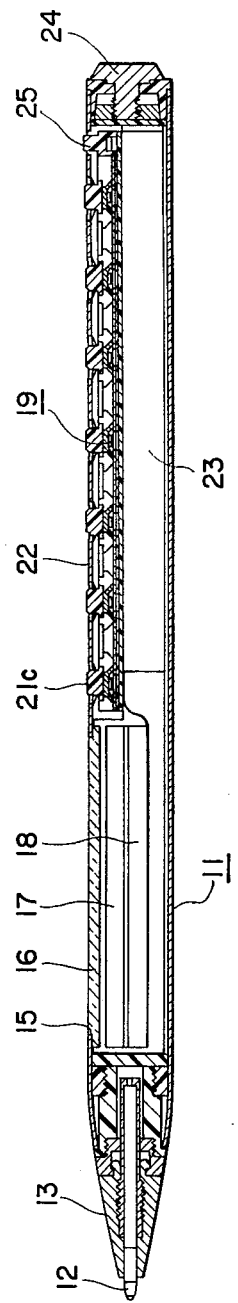
FIG. 2 is a cross-sectional view taken along the line I—I in FIG. 1.
Figure 4:
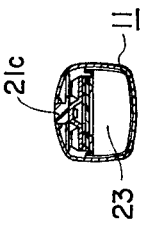
FIG. 4 is a cross-sectional view taken along the line II—II in FIG. 1.
Figure 3:
FIG. 3 is a right end view of the calculator shown in FIG. 1.

As illustrated in FIGS. 1 to 3, the electronic digital calculator of this invention has an elongated tubular body 11 having a size and shape similar to an ordinary fountain pen. One end portion of the body 11 is tapered and a ball-point pen proper 12 is inserted into the tapered end portion from the tip thereof to lie on the axis of the body 11. The ball-point pen proper 12 is adapted to be drawn back into the body 11 or projected out therefrom by turning the end portion 13 of the body 11 on the side of the ball-point pen proper. Since this construction can be made identical with that disclosed, for example, in U.S. Pat. No. 4,007,364 entitled "Writing Instrument with Calculator," no detailed description will be given. On the circumferential surface of the body 11 on the end opposite from the ball-point pen proper 12, a clip 14 is mounted to extend in the lengthwise direction of the body 11.

The body 11 has formed therein a display window 15 extending in its lengthwise direction on the side of the rotary end portion 13. The window 15 is covered with a transparent filter 16. In the body 11, display elements 17, for instance, light emitting diodes, are disposed in opposing relationship to the filter 16. Behind the display elements 17, there are disposed semiconductor integrated circuit elements 18 of a calculator circuit which performs a calculation based on information such as an inputted numerical value or function and supplies the calculation result to the display elements 17 for displaying it. A keyboard switch 19 is housed in the body 11 adjacent to the display filter 16 on the side of the clip 14. The keyboard switch 19 has a plurality of keys 21, which are respectively disposed to protrude slightly above the surface of the body 11 through openings 22 formed therein. By selective actuation of the keys 21 from the outside, information such as a numerical value or function can be selectively inputted to the semiconductor integrated circuit elements 18. At the back of the keyboard switch 19, there is disposed a battery 23 for actuating the display elements 17 and the semiconductor integrated circuit elements 18. The battery 23 can be exchanged by removing a cap 24 of the body 11 on the side of the clip 14 by turning the cap. A power source switch is disposed on the keyboard switch 19 and its actuator 25 protrudes slightly above the surface of the body 11 through an opening formed therein near the cap 24.

The keys 21 of the keyboard switch 19 are disposed in three rows 26, 27 and 28 in the lengthwise direction of the body 11. The keys 21 in each of adjacent ones of the rows, 26, 27 and 28 are mounted so that they are longitudinally spaced from each other, and the keys in each row are staggered relative to the keys in an adjacent row, as illustrated. The keyboard switch 19 is arranged so that when the key arrays 26 to 28 are disposed substantially horizontally, keys 21c of the central key array 27 are higher than those of the key arrays 26 and 28 and that the keys 21b and 21f of the latter are substantially flush with each other, as shown in FIG. 5 to 8. The difference in height between the keys 21c and keys 21b and 21f is selected to be, for example, about 0.5 mm. The keyboard switch 19 has such a construction as depicted in FIGS. 5 to 9 in which required fixed contacts and wiring 32 connected thereto are printed on an insulated substrate 31 and fixed contact pieces 33a to 33c for the power source switch are disposed on one end portion of the substrate 31 in its widthwise direction.

Figure 10:
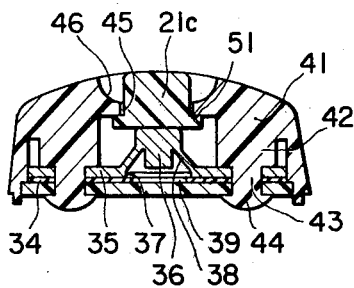
FIG. 10 is a cross-sectional view taken along the line IV—IV in FIG. 5.
Figure 11:
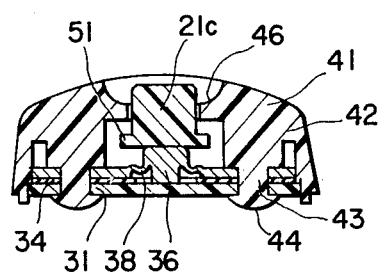
FIG. 11 is a diagram showing the state in which a key is pressed in FIG. 10.

A conductive sheet 35 as of conductive rubber is mounted on the substrate 31 through a spacer 34 of an insulating material. The conductive sheet 35 has integrally formed therewith movable contact pieces 36 respectively corresponding to the keys 21, which contact pieces are displaced by the key operation. For example, as shown in FIG. 10, holes 37 are formed in the conductive sheet 35 corresponding to the keys 21 and the movable contact pieces 36 of short columnar configuration are respectively disposed above the holes 37 on the opposite side from the substrate 31. The periphery of the intermediate portion of each contact piece 36 is linked to the marginal edge of each hole 37 through a coupling portion 38, as illustrated. The keys 21 are each mounted on the top of each contact piece 36. The spacer 34 has also formed therein holes 39 respectively communicating with the holes 37 of the conductive sheet 35. When the key 21 is pressed towards the substrate 31, the coupling portion 38 is elastically deformed and the lower end face of the contact piece 36 is moved down into contact with a pair of fixed contacts on the substrate 31 through the holes 37 and 38 to electrically interconnect the fixed contacts, as shown in FIG. 11, by which any one of numerical values 0 to 9 or function information such as addition, subtraction, multiplication, division or clear, corresponding to the key depressed, is inputted to the semiconductor integrated circuit element 18 depicted in FIG. 1. Releasing the key 21, the contact piece 36 is disengaged by the elasticity of the coupling portion 38 from the contacts on the substrate 31 to return to the state of FIG. 10 while pushing up the key 21. Accordingly, the key 21 is biased outwardly by the conductive rubber sheet 35.

A frame 41 is mounted on the substrate 31 from above the conductive sheet 35 and the keys 21. The frame 41 is a molding of a synthetic resin, and the inner surface of the frame 41 has formed thereon bosses 42 to project therefrom. Pins 43 are planted on the projecting end face of each of the bosses 42. The pins 43 project out from the substrate 31 through small holes formed in the conductive sheet 35, the spacer 34 and the insulated substrate 31. The projecting end portions 44 of the pines 43 are softened by heating and enlarged and the substrate 31, the spacer 34 and the conductive sheet 36 are held between the enlarged end portions 44 and the end faces of the bosses 42 and, at the same time, the frame 41 is fixed to the substrate 31, the spacer 34 and the conductive sheet 36. The surface of the frame 41 on the opposite side from the substrate 31 is formed substantially semi-cylindrical to conform to the inner peripheral surface of the body 11 of FIG. 1. The frame 41 has formed therein holes 45 in which the keys 21 are respectively inserted. Inside the frame 41, a movable member 47 formed as a unitary structure with the switch actuator 25 is disposed across the fixed contact pieces 33a to 33c of the power source switch on the substrate 31, and a movable contact piece 48, which is selectively contacted with the fixed contact pieces 33a to 33c, is held by the movable member 47. The actuator 25 is inserted in a guide groove 49 formed in the frame 41 and, by moving the actuator 25 along the guide groove 49, the movable contact piece 48 is changed over to contact the pair of fixed contact pieces 33a and 33b or the pair of fixed contact pieces 33b and 33c, thus constituting a power source switch.

The surface of the frame 41 on the side of the substrate 31 is held in parallel with the substrate 31. The keys 21 are each mounted on the top of the contact piece 36 of conductive rubber, as described above, and the outer peripheral surface of the end portion of the key 21 on the side of the substrate 31 has formed integrally therewith a flange 51 so that the key 21 may not come out of the hole 45. The keys 21c of the central row 27 are formed taller than those 21b and 21f of the side rows 26 and 28. The keys 21c, 21b and 21f are arranged so that they protrude slightly above the outer peripheral surface of the frame 41 and are substantially flush with or protrude a little above the outer surface of the body 11 shown in FIG. 1. Further, the top surfaces of the keys 21b, 21c and 21f are formed to conform to the outer peripheral surface of the body 11. The hole 45 is slightly elongated in the lengthwise direction of the body 11 and the inner wall of the hole 45 is gradually inclined inwardly so that the hole 45 becomes smaller as the substrate 31 is approached. In short, the outer part of the inner peripheral wall of each hole 45 is enlarged to form a recess 46 which has a shallow dish-shaped section, as is evident from, for example, FIG. 10. The inner surface of the recess 46 is so shaped as to conform substantially to the bulb of a finger when the top surface of the key 21 is pressed with a finger tip. The hole 22 of the body 11 through which each key 21 protrudes has substantially the same size as the outside periphery of the recess 46.

An example of the numerical values of the abovesaid parts is as follows (referring to FIG. 5): The width $W_1$ and the length $L_1$ of the key 21 are 2.2 mm and 3 mm, respectively; the width $W_2$ and the length $L_2$ of the recess 46 are 4 mm and 5 mm, respectively; the distance $D_1$ between the center of the central key array 27 and the center of each of the key arrays 26 and 27 is 3 mm; the distance $D_2$ between the centers of adjacent ones of the keys 21 in the lengthwise direction of the body 11 is 9.5 mm; and the body 11 has a length of 140 mm, an increased diameter of 11 mm and a reduced diameter of 10 mm.

Figure 15:
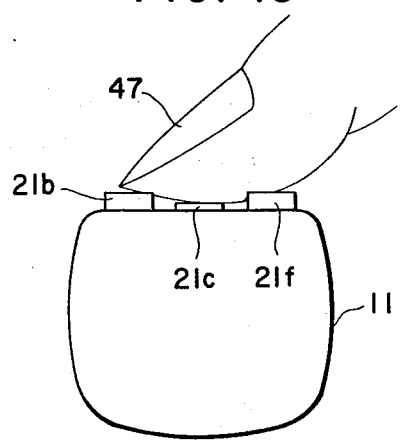
FIG. 15 is a diagram illustrating an erroneous actuation occurring when a desired one of keys disposed to be flush with one another is pressed.

In the case of the electronic digital calculator of this invention described above being used, the body 11 is held by one hand of the user and the keys are depressed by the other hand. In this case, when it is desired to actuate a key 21c of the central row 27, the plane of the key 21c is held substantially horizontal. At this time, since the key 21c assumes a higher position than the top surfaces of the keys 21b and 21f of the rows 26 and 28, it is ensured that a finger tip 47 touches first the key 21c, thus eliminating the possibility of the keys 21b and 21f being erroneously actuated. In other words, if, instead of using the arrangement of the present invention, the keys 21c, 21b and 21f protruded above the surface of the body and were substantially flush with one another as shown in FIG. 15, when the central key 21c was pressed by the finger tip 47, the key 21f disposed forwardly of the key 21c would also be pressed at the same time and if the key 21f were pressed earlier than the key 21c, erroneous information is inputted. With the calculator of this invention, however, since the key 21c is positioned higher than the others and since the recess 46 is formed as described above, the peripheral wall of the recess 46 prevents one part of the finger from pressing the adjoining keys.

Figure 13:
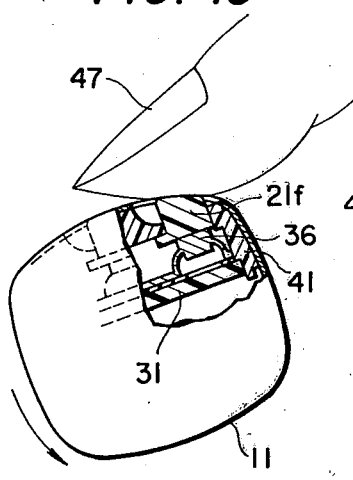
FIG. 13 is a diagram showing the state in which a key of one of key arrays on one side of the central array is pressed.

When it is desired to selectively actuate the keys 21f of the key array 28, the body 11 of the calculator is turned outwardly of the operator, that is, counterclockwise in FIG. 13, to bring the top surfaces of the keys 21f to the highest position. It will be readily seen that there is no fear of erroneous depression of the keys 21c and 21b of the other arrays. When it is desired to actuate a key 21b of the key array 26, the body 11 of the calculator is turned towards the operator, that is, clockwise in FIG. 14 so that the top surface of the key 21b may assume a position higher than the keys of the other arrays. Also in this case, the keys of the other key arrays would not be erroneously depressed. In the case of actuating the rows of keys 21b and 21f, their top surfaces are made horizontal by turning the body as described above, facilitating the key operation.

Since the top surfaces of the keys of the key arrays 26, 27 and 28 are each brought to the highest position and since the recess 46 is present, the likelihood of erroneous operation of the keys of other key arrays than the selected array is avoided by slightly turning the body 11 of the calculator about its axis. Further, since turning of the body 11 is very slight, the turning operation is also easy. Accordingly, the distance $D_1$ between adjacent ones of the key arrays can be reduced. Moreover, in the case of the body 11 being cylindrical as in the illustrated example, if the keys 21b, 21c and 21f of the key arrays are arranged so that their top surfaces parallel the peripheral surface of the body 11, the key of the central row automatically assumes the highest position relative to the keys of the other rows. Further, since the keys conform to the peripheral surface of the body 11, the keys do not hinder when the calculator is taken in and out of a pocket of the user's clothes. In addition, the outer surface of the body 11 is not uneven, so that the calculator is excellent from the viewpoint of design, too.

Figure 12:
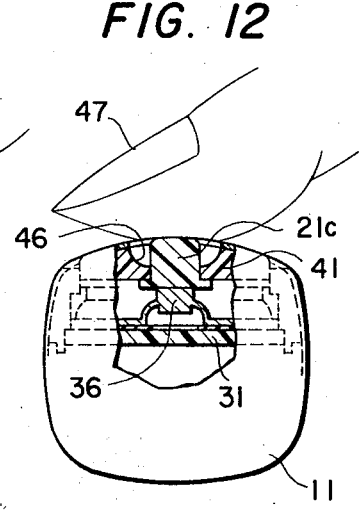
FIG. 12 is a diagram showing the state in which a key of a central one of key arrays is pressed.
Figure 14:
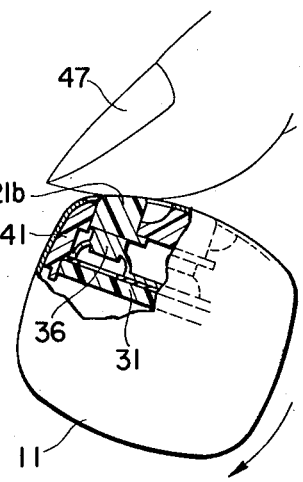
FIG. 14 is a diagram showing the state in which a key of the other key array is pressed.

Since the body 11 is long, the spacing of the keys 21 of the same row is relatively large, for example, 9.5 mm. Accordingly, there is no possibility that when a selected key is pressed by a finger, adjoining keys of the same row are simultaneously pressed. Even if the key is pressed hard, the adjoining keys are not pressed first because of the presence of the recess 46. The states in which the keys of the three rows are respectively touched by a finger tip are shown in FIGS. 12 to 14, respectively. The view shown in FIG. 16 is from the direction perpendicular to the view shown in FIGS. 12 to 14. FIG. 17 illustrates the state in which the key is pressed. Since the shape of the recess 46 substantially conforms to the inner surface of the finger tip pressing the key, the finger tip is prevented by the inner wall of the recess 46 from touching the keys on both sides of the pressed key. Accordingly, the stroke of the key can be made long, so that the operator gets the touch of key operation. Further, even if the key is a little pressed by an accidental contact with the user's hand or some other objects, no information is inputted. This ensures that only when the key is pressed sufficiently, information is inputted. Where the top surface of the key is formed convex as depicted in FIG. 18, since the inner surface of the finger tip is bulgy, the finger tip makes contact first with the projecting portion of the key, ensuring to select a desired key. Further, in this case, the top surface of each key is curved, the key does not hinder when the calculator is taken in and out of a pocket.

As has been described in the foregoing, in the calculator of this invention, since only one piece of information is inputted through each of the keys, key selection is easy, and since the keys of the respective key arrays lie at different heights and since the recesses 46 are provided, even if the keys are disposed closely to adjacent ones of them, there is no possibility or erroneous actuation of the adjoining keys at the same as a desired key is pressed. Accordingly, the calculator can be operated rapidly and accurately.

It will be apparent that many modifications and variations may be effected without departing from the scope of the novel concepts of this invention.

What is claimed is:

1. In a pen type electronic digital calculator of the type comprising:
   a tubular body;
   a display element for displaying a calculation result, the display element being disposed in one of half portions of the tubular body and arranged to be viewed from the outside through a display window formed in the outer peripheral surface of the tubular body in its lengthwise direction;
   a semiconductor integrated circuit element for calculation mounted in the tubular body for supplying the display element with a signal indicative of the result of a calculation;
   a battery mounted in the tubular body for supplying operating electric power to the display element and the semiconductor integrated circuit element; and
   a keyboard switch having a plurality of keys for inputting numerical value and function information to the semiconductor integrated circuit element for calculation, the keyboard switch being mounted in the other half portion of the tubular body and disposed on the line of extension of the display element;
   the improvement wherein the keys are each adapted to input only one piece of information, the keys of said keyboard switch being arranged in three adjacent rows in the lengthwise direction of the tubular body, the keys of each of said rows being disposed in staggered relation to the keys of an adjacent one of said rows, the spacing between adjacent keys in each of said rows being greater than the length of each of said keys along said row, said tubular body being formed with a plurality of depressed recesses in its outer surface, each of the keys being disposed within one of said recesses respectively with the outer peripheral surface of the key being spaced from the peripheral walls of its associated recess, and said keys being so dimensioned and so positioned within their respective recesses that when the tubular body is oriented to position the three rows of keys substantially horizontally, the central row of keys assumes the highest position.

2. A pen type electronic digital calculator according to claim 1, including a frame in said tubular body for positioning the keys on the keyboard switch, said frame having a plurality of holes therein through which said keys respectively protrude, each of said recesses being formed contiguous to the hole in the frame through which the key associated with said recess protrudes.

3. A pen type electronic digital calculator according to claim 1, wherein each of said recesses is shaped to substantially conform to the inner surface of a finger tip pressing the top surface of the key for the actuation thereof.

4. A pen type electronic digital calculator according to claim 1, wherein the tubular body is cylindrical, the top surface of each key being substantially flush with the outer peripheral surface of said tubular body and shaped to substantially conform thereto.

5. A pen type electronic digital calculator according to claim 1, wherein the top surface of each key is curved convex.

* * * * *